US008554879B2

(12) United States Patent
Yu et al.

(10) Patent No.: US 8,554,879 B2
(45) Date of Patent: Oct. 8, 2013

(54) METHOD FOR AUDIO AND VIDEO CONTROL RESPONSE AND BANDWIDTH ADAPTATION BASED ON NETWORK STREAMING APPLICATIONS AND SERVER USING THE SAME

(75) Inventors: Jen-Yu Yu, Taichung County (TW); Hsin-Hua Lee, Tainan County (TW); Hui-Ping Kuo, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1057 days.

(21) Appl. No.: 12/489,080

(22) Filed: Jun. 22, 2009

(65) Prior Publication Data

US 2010/0161761 A1   Jun. 24, 2010

(30) Foreign Application Priority Data

Dec. 22, 2008   (TW) ................................ 97149999 A

(51) Int. Cl.
  *G06F 15/16*   (2006.01)
(52) U.S. Cl.
  USPC ........... 709/219; 709/212; 709/215; 709/213; 709/214; 709/201; 709/202
(58) Field of Classification Search
  USPC ................. 709/219, 212, 215, 213, 201, 202, 709/214
  See application file for complete search history.

(56) References Cited

U.S. PATENT DOCUMENTS

| | | | |
|---|---|---|---|
| 5,640,388 A * | 6/1997 | Woodhead et al. | 370/468 |
| 6,031,584 A * | 2/2000 | Gray | 375/240.28 |
| 6,233,226 B1 * | 5/2001 | Gringeri et al. | 370/252 |
| 6,292,834 B1 * | 9/2001 | Ravi et al. | 709/233 |
| 6,408,005 B1 * | 6/2002 | Fan et al. | 370/412 |
| 6,704,790 B1 | 3/2004 | Gopalakrishnan | |
| 7,085,842 B2 * | 8/2006 | Reid et al. | 709/231 |
| 7,111,058 B1 | 9/2006 | Nguyen et al. | |
| 7,376,158 B2 * | 5/2008 | Woodward, Jr. | 370/516 |
| 7,411,901 B1 * | 8/2008 | Alexander et al. | 370/230 |
| 7,764,608 B2 * | 7/2010 | Breynaert et al. | 370/230 |
| 7,797,723 B2 * | 9/2010 | Demircin et al. | 725/143 |
| 7,890,985 B2 * | 2/2011 | Bowra et al. | 725/88 |
| 7,924,884 B2 * | 4/2011 | Kailash et al. | 370/498 |

(Continued)

OTHER PUBLICATIONS

Yuheng Qiu et al, "Fast Channel Switching for Hybrid Unicast/Broadcase Mobile Television," Broadband Multimedia Systems and Broadcasting, 2008 IEEE International Symposium, pp. 1-4, Mar. 2008, US.

(Continued)

*Primary Examiner* — Lan-Dai T Truong

(57) ABSTRACT

A method for audio and video control response and bandwidth adaptation based on network streaming applications is disclosed. A server delivers a received control command to a stream controller while a player empties the expired streaming data stored in a buffer thereof. The stream controller controls the input source of a video/audio capturer. The receiver buffer estimator of the receiver estimates whether the amount of the streaming data stored in the buffer is within a safe range and delivers the estimation result and bandwidth variation information to a stream adaptor. If the amount of the stream data is less than a threshold value, the timestamp scalar is adjusted based on the estimation result and the bandwidth variation information, thereby adjusting the consumption rate of the streaming data in the buffer of the player for re-accumulating streaming data of the buffer.

13 Claims, 4 Drawing Sheets

(56) References Cited

U.S. PATENT DOCUMENTS

| | | | |
|---|---|---|---|
| 7,970,020 B2* | 6/2011 | Hannu et al. | 370/516 |
| 2002/0112004 A1* | 8/2002 | Reid et al. | 709/205 |
| 2003/0198184 A1* | 10/2003 | Huang et al. | 370/231 |
| 2004/0071088 A1* | 4/2004 | Curcio et al. | 370/235 |
| 2004/0193762 A1 | 9/2004 | Leon et al. | |
| 2005/0238061 A1* | 10/2005 | Woodward, Jr. | 370/516 |
| 2006/0029080 A1* | 2/2006 | Kappler et al. | 370/395.4 |
| 2006/0056523 A1 | 3/2006 | Guillotel et al. | |
| 2006/0095472 A1* | 5/2006 | Krikorian et al. | 707/104.1 |
| 2006/0095943 A1* | 5/2006 | Demircin et al. | 725/81 |
| 2006/0215676 A1 | 9/2006 | Ratakonda et al. | |
| 2006/0282566 A1 | 12/2006 | Virdi et al. | |
| 2008/0013559 A1* | 1/2008 | Smith et al. | 370/412 |
| 2008/0181221 A1* | 7/2008 | Kampmann et al. | 370/389 |
| 2009/0052323 A1* | 2/2009 | Breynaert et al. | 370/235 |
| 2009/0234983 A1* | 9/2009 | Golden et al. | 710/30 |

OTHER PUBLICATIONS

Taiwan Patent Office, Office Action, Patent Application Serial No. 097149999, Aug. 22, 2012, Taiwan.

China Patent Office, Office Action, Patent Application Serial No. 200910000382.7, Feb. 24, 2011, China.

* cited by examiner

METHOD FOR AUDIO AND VIDEO CONTROL RESPONSE AND BANDWIDTH ADAPTATION BASED ON NETWORK STREAMING APPLICATIONS AND SERVER USING THE SAME

CROSS REFERENCE TO RELATED APPLICATIONS

This application claims priority of Taiwanese Patent Application Serial No. 097149999, filed on Dec. 22, 2008, the entirety of which is incorporated by reference herein.

BACKGROUND OF THE INVENTION

1. Field of the Invention

The invention relates to video control, and more particularly to a method for audio and video control response and bandwidth adaptation based on network streaming applications and a server using the same.

2. Description of the Related Art

Generally, when a video stream is retrieved via a network, due to the large amount of transmission data, a player must buffer some certain amount of streaming data to adapt to bandwidth variations, so that interruption or jittering can be prevented while watching the streaming video. However, the streaming latency increases as the length of buffered data grows, which results in inconvenience for the users who needs interaction controls in the streaming applications. For example, when changing TV channels over the network, the waiting time between changes may be excessively long.

As for video surveillance, when the camera detects any special event, the latest frame for that special event must be transmitted over the Internet to the user immediately, and in such case the server should actively trigger a video control. In general, the player is required to prepare some buffered data to adapt to the variations of the network bandwidth. However, buffering data results in latency and that would cause a conflict when rapid control reaction time is required. Thus, a method which can take both video controlling reaction and bandwidth adaptation into consideration is desirable.

Additionally, when playing the streaming, if the bandwidth is substantially reduced, generally, transmission latency will occur and the streaming data stored in the data buffer will be exhausted, thus, requiring the player to stop to accumulate streaming data once again. Thus, a method for adjusting for bandwidth variations is desired to keep smooth playback when streaming.

Thus, the invention provides a method for audio and video control response and bandwidth adaptation based on network streaming applications, simultaneously achieving management for video control reactions and network bandwidth adjustments.

BRIEF SUMMARY OF THE INVENTION

Methods for audio and video control response and bandwidth adaptation based on network streaming applications are provided. One implement of a method for audio and video control response and bandwidth adaptation based on network streaming applications comprises the following. A control command received by a server is delivered to the stream controller of the server; at the mean while the player empties the streaming data stored in the buffer either when discovering the expired data in the buffer by the player itself or when receiving buffer expiration notification message from the server. The stream controller is enabled to control the input source of a video/audio capturer and reset the statistics of a receiving buffer estimator in the QoS controller. Buffer estimator is used to estimates the amount of streaming data stored in the player buffer. The estimation result and bandwidth variation information detected by the server are delivered to a stream adaptor. It determines whether the amount of the streaming data stored in the player buffer is less than a threshold value. The stream adaptor is enabled to adjust a timestamp scalar according to the estimation result and the bandwidth variation information if the amount of the stream data is less than the threshold value, thereby adjusting the consumption rate of the streaming data stored in the player buffer for re-accumulating streaming data of the buffer indirectly.

In general, in one aspect, the invention provides apparatus, including an embodiment of a server comprises a video/audio capturer, a QoS controller, a communicator, a stream controller, and a stream adaptor. The video/audio capturer selects the input source of streaming data. The QoS controller further comprises a receiving buffer estimator and a congestion detector. After the player sends a control command, the communicator of the server receives control commands from the player, forwards to the stream controller. The player can either discover the expiration of the buffered streaming data by itself and empty its buffer or flush the expired buffered data notified with the buffer expiration message sent from the server. When the stream controller receives the control command from the communicator, it controls the input source and stream contents of a video/audio capturer, and resets the receiving buffer estimator. The stream adaptor further comprises a profile selector, a table of quality profiles, and a timestamp adjuster. The receiver buffer estimator estimates the amount of streaming data buffered in the buffer of the player. The stream adaptor retrieves the estimation result and the bandwidth variation information detected by the congestion detector and determines whether the amount of the streaming data stored in the buffer of the player is less than a threshold value. The profile selector adjusts the timestamp scalar according to the estimation result and the bandwidth variation information if the amount of the streaming data is less than the threshold value, thereby adjusting the consumption rate of the streaming data stored in the buffer for re-accumulating streaming data of the player buffer.

A detailed description is given in the following embodiments with reference to the accompanying drawings.

BRIEF DESCRIPTION OF THE DRAWINGS

The invention can be more fully understood by reading the subsequent detailed descriptions and examples with references made to the accompanying drawings, wherein.

DETAILED DESCRIPTION OF THE INVENTION

Figure 1:
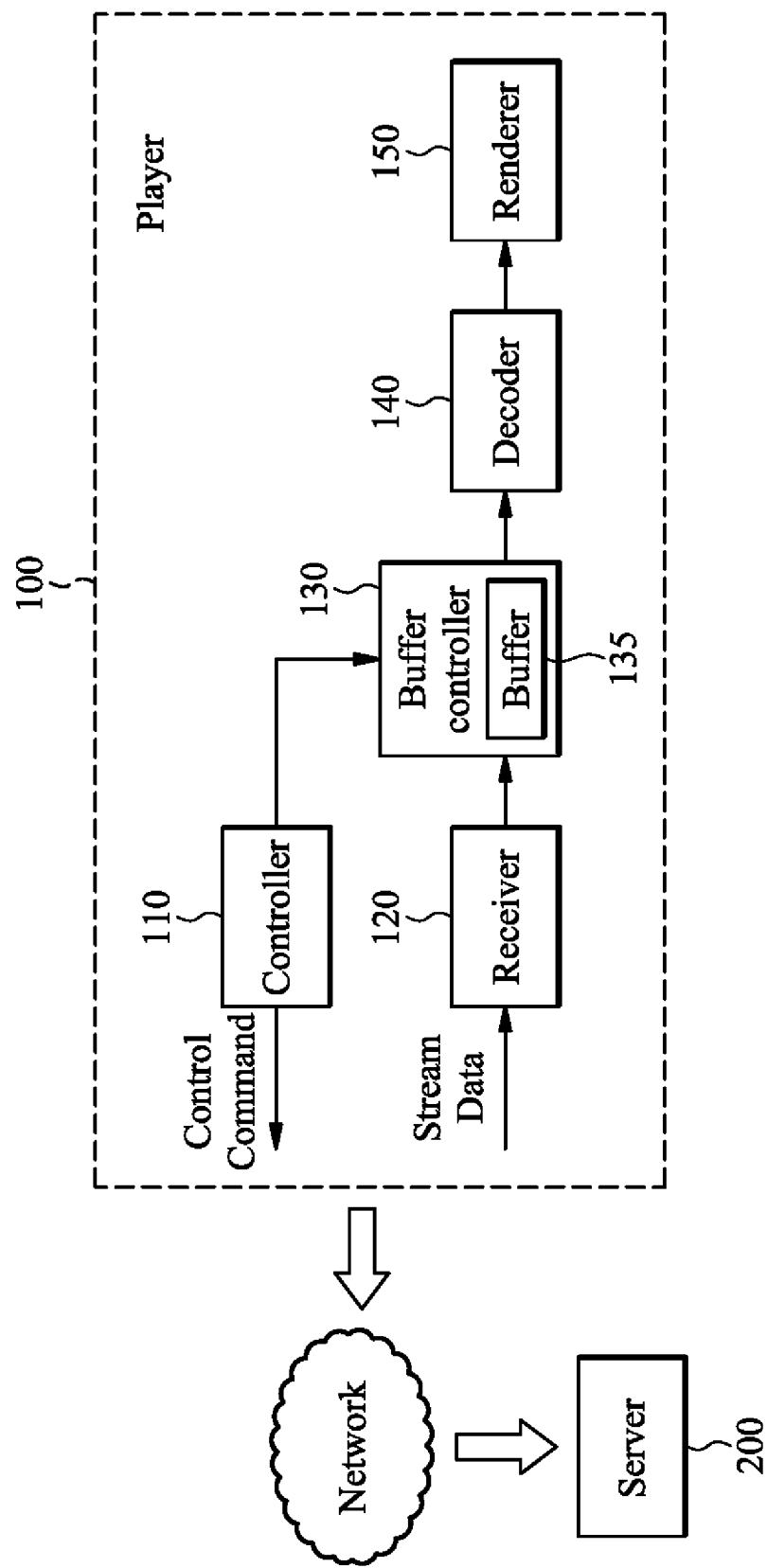
FIG. 1 is a schematic view of a player of the present invention.

Several exemplary embodiments of the invention are described with reference to FIGS. 1 through 4, which generally relate to audio and video control response and bandwidth adaptation based on network streaming application. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method for audio and video control response and bandwidth adaptation based on network streaming application.

An embodiment of the method for audio and video control response and bandwidth adaptation based on network streaming applications is implemented in a server so that playing of real-time video can be uninterrupted while streaming data can still be re-accumulated and buffered and optimum bandwidth adaptation can be achieved under changing network bandwidth. Thus, bandwidth adaptation method is improved while audio/video control can be responded smoothly and rapidly.

When interactive controls of video is implemented, such as selecting input sources, switching TV programs, fine tuning video pictures, and controlling the lens of a video camera, the amount of transmission data can be effectively managed by providing the network bandwidth adaptation method in the invention of method for audio and video control response and bandwidth adaptation based on network streaming applications, and so that the users can be provided with smooth and stable quality of video.

FIG. 1 is a schematic view of a player of the present invention.

The player 100 of the invention comprises a controller 110, a receiver 120, a buffer controller 130, a decoder 140, and a renderer 150. The player 100 receives streaming data from the receiver 120 and stores the streaming data in the buffer 135 to be managed by the buffer controller 130. The buffer controller delivers the streaming data to the decoder 140 based on timestamp information of the streaming data for decoding and the decoded stream data is played using the renderer 150. When the player 100 performs a video control operation, the controller 110 transmits a control command to the server 200. At this time, the streaming data stored in the buffer 135 should have been expired. Thus, the player 100 can ask the controller 130 to flush the expired buffered streaming data while the control command is sent. In another embodiment of this disclosed method, the server 200 can also send a buffer expiration message to notify the player 100 that the buffered streaming data within some time period are expired and should be flushed.

Figure 2:
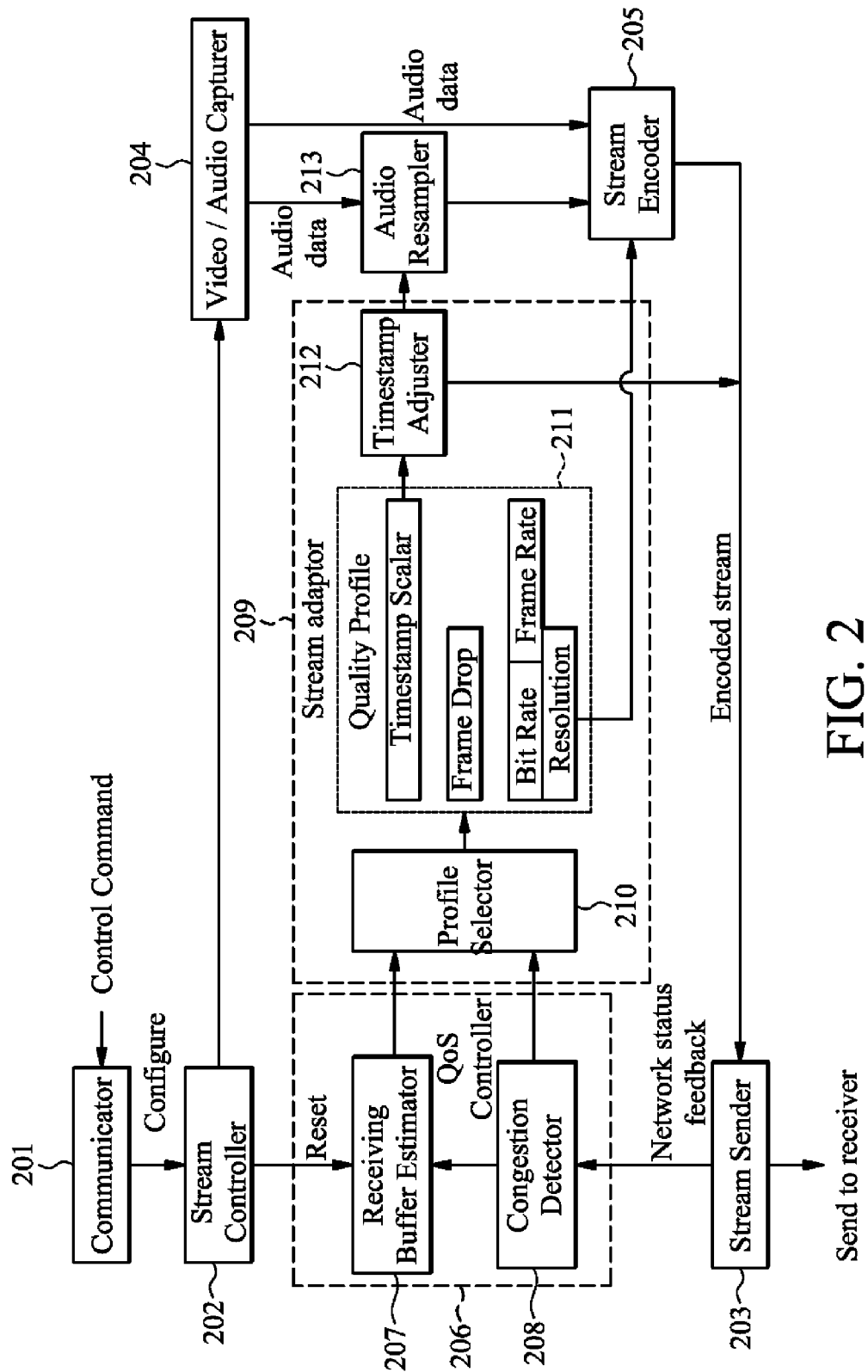
FIG. 2 is a schematic view of a server of the present invention.

FIG. 2 is a schematic view of a server of the present invention.

The server 200 of the invention comprises a communicator 201, a stream controller 202, a stream sender 203, a video/audio capturer 204, a stream encoder 205, a QoS controller 206, a stream adaptor 209, and an audio re-sampler 213. The QoS controller 206 further comprises a receiving buffer estimator 207 and a congestion detector 208. The stream adaptor 209 further comprises a profile selector 210, a quality profile 211, and a timestamp adjuster 212.

The stream controller 202 receives the control command from the player 100 via the communicator 201 to directly manage video contents, such as switching TV programs or input sources (i.e., the Digital Video Disc (DVD) player), and sends a reset command to enable the receiving buffer estimator 207 to reset estimation parameters for the buffer 135 of the player 100, thus making correct determinations for processing subsequent quality adjustment of video contents. In some embodiments, the communicator 201 also sends a buffer expiration message to the player 100 to notify that some expired data should be flushed.

Figure 3:
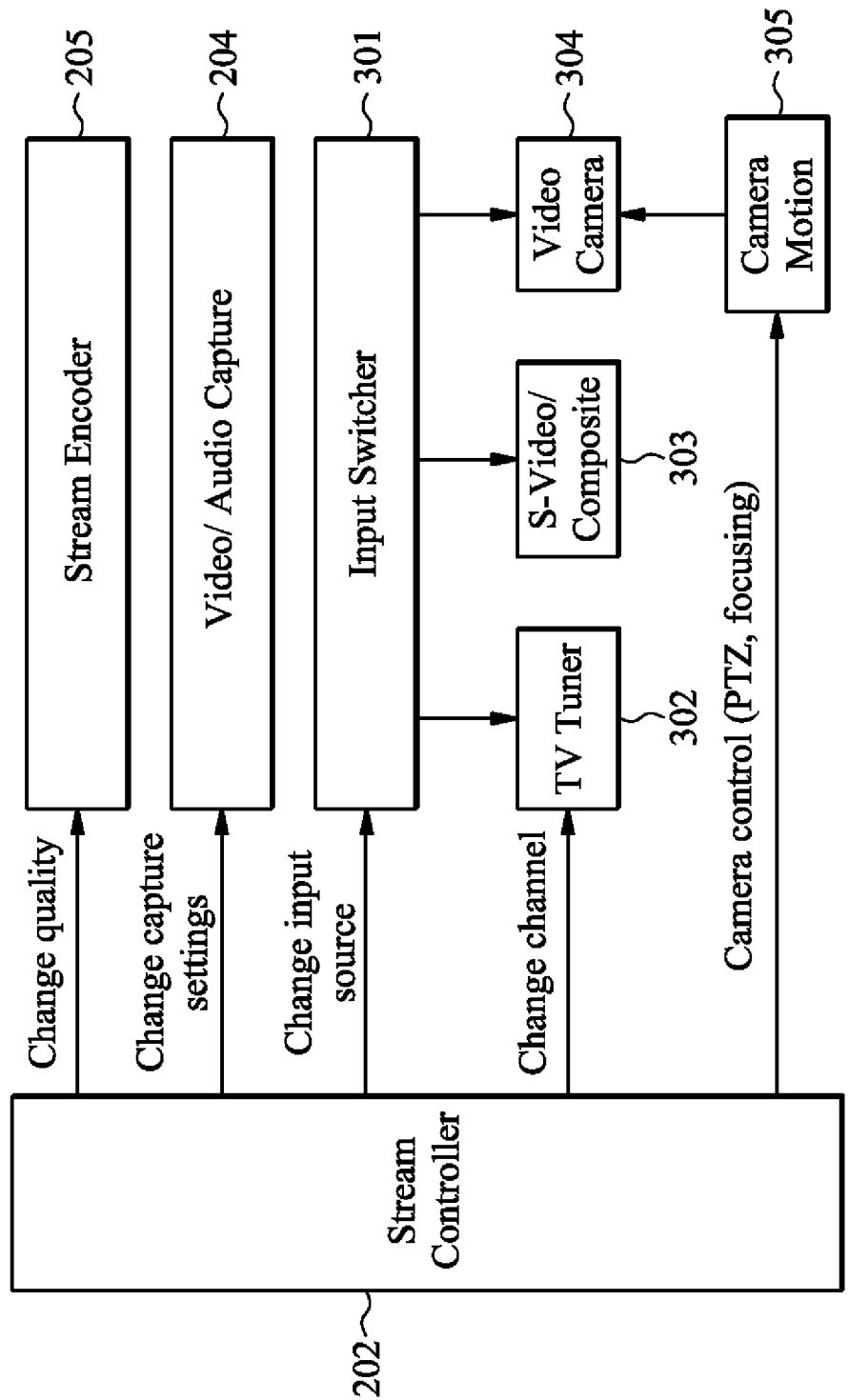
FIG. 3 is a schematic view of a stream controller of the present invention.

FIG. 3 is a schematic view of a stream controller of the present invention.

The stream controller 202 can directly control modules of the server 200 comprising setting encoding parameters of the stream encoder 205, setting capture parameters (the brightness and chrominance of an image, for example) of the video/audio capturer 204, or setting an input source of the input switcher 301. For example, the input source comprises a TV tuner 302, a video input terminal 303 (such as S-video or Composite video), or an external video camera 304. The stream controller 202 controls channel switches of the TV tuner 302 and allows the camera motion controller 305 to perform panning, tilting, and zooming operations on that video camera 304.

The QoS controller 206 is used by the server 200 for QoS adaptation. The congestion detector 208 of the QoS controller 206 receives feedback information collected by transmission of the stream data by the stream sender 203 to determine whether a network is congested. The QoS controller enables the stream adaptor 209 to select one of the predefined settings in the quality profile 211 based on the network congestion status to adapt the streaming data to the bandwidth.

The QoS controller 206 also estimates the capability to endure the bandwidth variation for the player 100 using the receiving buffer estimator 207. When the streaming data buffer in the buffer 135 of the player 100 is regarded as insufficient, an appropriate adaptation method will be selected by the stream adaptor 209.

When the player 100 performs video switching or the network bandwidth is instable, the length of buffer 135 will be dynamically adjusted. The receiving buffer estimator 207 estimates the streaming data length buffered in the buffer 135 of the player 100 based on the transmission status of the network to determine whether adjusting of the video quality and video timestamp should be performed in order to let the player 100 be able to keep playing streaming smoothly. In this way, the server 200 can estimate the player buffering status without interchanging messages over the network and make this kind of transmission overhead minimized A formula for the estimation is represented by:

$$R_{buf}(t_p) = \text{Min}\left[\left(\int_{t=0}^{t_p}(r(t)-1)\,dt - T_{sys} - T_{app}\right), T_{max}\right],$$

where $t_p$ represents time passes after receiving the control command, $T_{max}$ represents the maximum time length of streaming data should be buffered in the buffer 135 of the player 120, $r(t)$ represents the value of timestamp scalar at time t, $T_{sys}$ represents the time length of unsent video data in the buffer under the system layer, $T_{app}$ represents the delay time of a data queue for an application, and $R_{buf}(t_p)$ represents an accumulated time length, by the estimation of the server 200, of the buffer 135 of the player 100 at time $t_p$. In other words, it represents the maximum time the player could endure to keep playing if in the worst case the network is heavily congested.

Note that the described estimation method is only an embodiment and is not to be limitative.

The profile selector 210 of the stream adaptor 209 determines the way to adapt the streaming data to network bandwidth according to bandwidth congestion information retrieved from the QoS controller 206 and the receiving buffer estimator 207. The predefined settings in the quality profile 211 comprise an encoding bit rate, resolution, a frame rate, frame drop option, and the timestamp scalar.

Specifically, when available bandwidth is reduced, encoding bit rate can be slight decreased first so that the visual quality will not be affected too much. If the streaming data buffered in the buffer 135 of the player 100 is obviously insufficient by the estimation, especially after flushing the buffer due to video control operations, the timestamp scalar would be adjusted with higher priority.

If the setting of changing the encoding quality is selected, the profile selector 210 selects, from the quality profile 211, and applies an appropriate setting to the stream encoder 205. If the setting of dropping frames is selected, the number of frames to be dropped is determined. If the setting of adjusting the timestamp scalar is selected, selected parameters are applied to the timestamp adjuster 212 for adjusting the timestamp.

The timestamp is referred to by the player 100 for determining the time at which a video and audio frame should be played. The timestamp adjuster 212 adjusts the timestamp interval between two successive frames according to the timestamp scalar to ensure the video and audio data can still be played smoothly and synchronously.

As an exemplary embodiment, when the timestamp scalar is adjusted using the timestamp adjuster 212, the playing speed of streaming data of the player 100 is affected. If the timestamp scalar is notated as r and assumes r=1.1, the timestamp interval between the two successive frames will be adjusted from 200000 μs, which is before adjusted in a 5 frames-per-second video, to 220000 μs after adjustment. Thus, the time consumed to play the streaming data with adjusted timestamp interval becomes an r multiple of the original timestamp interval. The value of timestamp scalar r here is only an example and is not to be limitative.

Advantages of using the described adjustment method are as follows. When a control operation such as switching programs is performed, streaming data buffered before the control operation is performed becomes meaningless and is thus flushed, and only small amount of streaming data is still buffered so that fast control response can be achieved. When the timestamp scalar is adjusted using the timestamp adjuster 212, additional sophisticated designs for the player 100 is not required since that the bandwidth adaptation and buffer control can be completed at the server side and the desirable streaming data can still be re-accumulated without stopping playback (when r>1.0, the rate of accumulating the streaming data becomes r−1). Further, when bandwidth adaptation for the server 200 is required, it is another innovative method can be used for the bandwidth adaptation besides frame dropping, adjusting the encoding bit rate or frame rate directly. Since frame dropping may affect the visual quality dramatically and the fineness of adjusting the frame rate is often limited by the capability and practical design of the stream encoder 205.

When the timestamp scalar is adjusted using the timestamp adjuster 212, the audio streaming data captured by the video/audio capturer 204 is re-sampled using the audio re-sampler 213 to ensure that sampled points of the audio data are uniformly distributed in the time intervals of the adjusted timestamp. Finally, the video data and the re-sampled audio data are delivered to the stream encoder 205 and are encoded based on the selected setting from the quality profile 211, thus outputting encoded frames. The encoded frames are transmitted by the stream sender 203 to the player 100 with the adjusted timestamp and feedback information obtained by the stream sender 203 is returned to the QoS controller 206 for a next determination.

Figure 4:
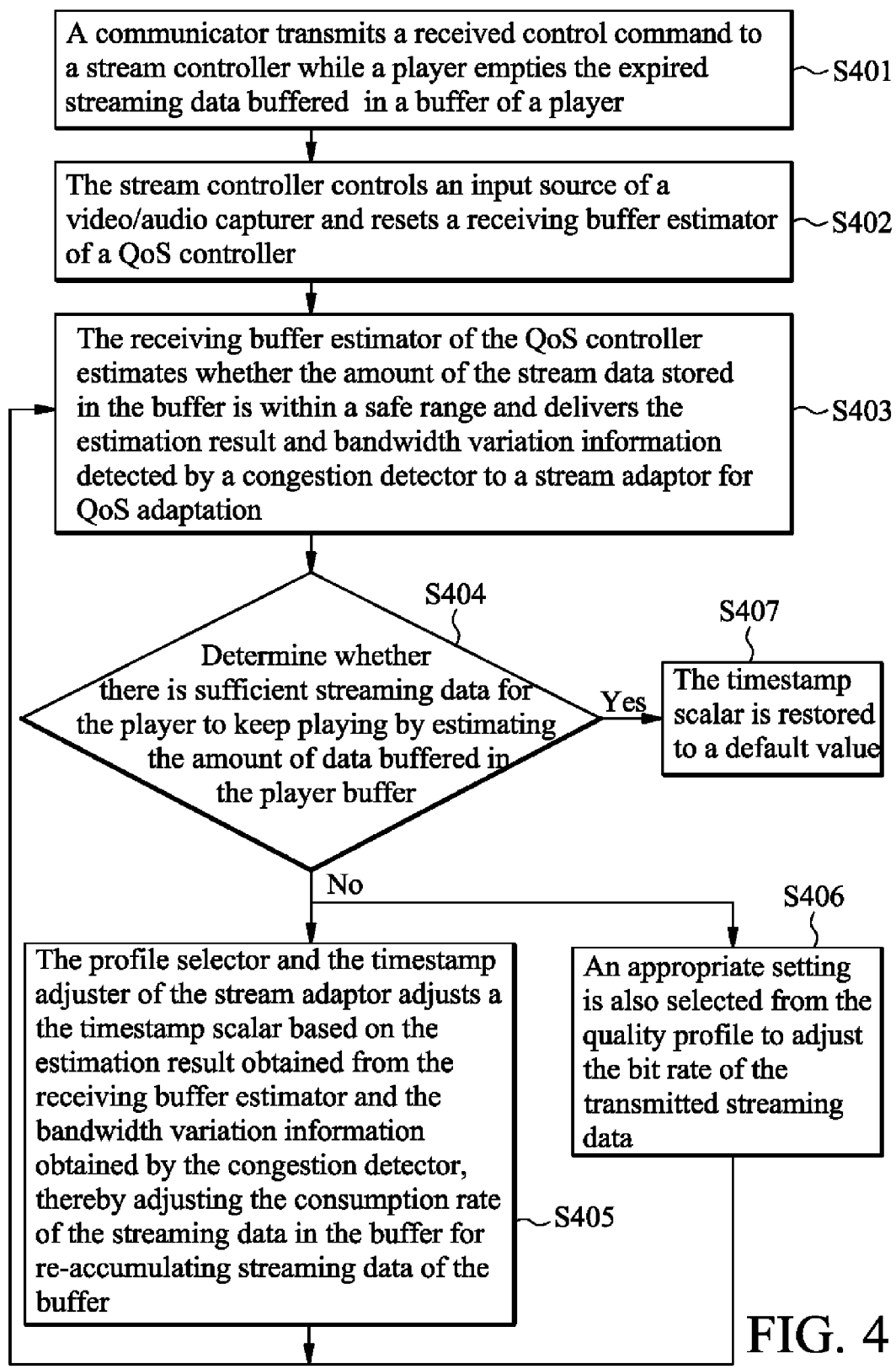
FIG. 4 is a flowchart of a method for audio and video control response and bandwidth adaptation based on network streaming applications of the present invention.

FIG. 4 is a flowchart of a method for audio and video control response and bandwidth adaptation based on network streaming applications of the present invention.

When a communicator receives a control command (a program switching command, for example), the control command is transmitted to a stream controller. As for the player, the player empties the receiving buffer if it discovered that the data are expired. (step S401). Besides in another embodiment, the control event may also be triggered actively by the server 200 and in such case the player will empty the buffer on receiving the buffer expiration message, which specifies the range of time period should expire. The stream controller controls an input source of a video/audio capturer and resets a receiving buffer estimator of a QoS controller (step S402). The receiving buffer estimator of the QoS controller estimates whether the amount of the stream data stored in the buffer is within a safe range and delivers the estimation result and bandwidth variation information detected by a congestion detector to a stream adaptor for QoS adaptation (step S403).

The QoS controller then determines whether there is sufficient streaming data for the player to keep playing by estimating the amount of data buffered in the player buffer (step S404). If the amount of the stream data is less than a threshold value (which indicating the amount of the stream data stored in the buffer is insufficient for playing), the profile selector and the timestamp adjuster of the stream adaptor adjust the timestamp scalar based on the estimation result obtained from the receiving buffer estimator and the bandwidth variation information obtained by the congestion detector, thereby adjusting the consumption rate of the streaming data in the buffer for re-accumulating streaming data of the buffer (step S405); Besides, an appropriate setting is also selected from the quality profile to adjust the bit rate of the transmitted streaming data (step S406). When the receiving buffer estimator determines that the amount of the stream data has been accumulated to a predetermined amount $T_{max}$ (i.e. a maximum time length of the buffer of the receiver 120), the timestamp scalar is restored to a default value (1, for example) (step S407). Thus, interruption or stop for re-accumulating buffer data again due to running out of buffered streaming data can be prevented by adjusting the consumption rate of the streaming data in the buffer.

An embodiment of the method for audio and video control response and bandwidth adaptation based on network streaming applications allows fast reaction of video controls that substantially improves user experience and provides stable transmission quality and bandwidth adaptation. Thus, acceptable video playing quality can still be provided even under the changing network environment.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for audio and video control response and bandwidth adaptation based on network streaming applications, applied to a server connected to a player through a network, comprising:

transmitting a control command received by a stream communicator of the server to a stream controller of the server and enabling the player to empty a buffer of the player or flush an expired buffered streaming data in the buffer, wherein the expired buffered streaming data is notified with a buffer expiration message sent by the stream communicator;

enabling the stream controller to control an input source of an input switcher;

estimating whether an amount of streaming data stored in the buffer is within a range by a receiving buffer estimator of a QoS controller of the server;

detecting bandwidth variation information by a congestion detector of the QoS controller;

delivering a result of estimating whether the amount of the streaming data stored in the buffer is within the range and the bandwidth variation information-to a stream adaptor of the server;

determining whether the amount of the streaming data stored in the buffer is less than a threshold value; and enabling the stream adaptor to adjust a timestamp scalar according to the result of estimating whether the amount of the streaming data stored in the buffer is within the range and the bandwidth variation information if the amount of the streaming data stored in the buffer is less than the threshold value, thereby adjusting a consumption rate of the streaming data stored in the buffer for re-accumulating the streaming data stored in the buffer, wherein the timestamp scalar is restored to a default value by the stream adaptor when the streaming data stored in the buffer is accumulated to a predetermined amount, and wherein one of a plurality of settings in a quality profile is selected by the stream adaptor according to the result of estimating whether the amount of the streaming data stored in the buffer is within the range and the bandwidth variation information to adjust a bit rate of the streaming data stored in the buffer if the amount of the streaming data stored in the buffer is less than the threshold value.

2. A system implemented on a machine for audio and video control response and bandwidth adaptation based on a network streaming application, comprising:

a video and audio capturer configured to capture streaming contents from an input source selected by an input switcher;

hard drives;

a QoS controller, further comprising a receiving buffer estimator and a congestion detector;

a communicator configured to receive a control command from a player;

a stream controller configured to receive the control command from the communicator, to enable the player to empty an expired buffered streaming data in a buffer of the player, to control the input source and the streaming contents of the video and audio capturer, and to reset the receiving buffer estimator; and a stream adaptor, further comprising a profile selector, a quality profile, and a timestamp adjuster, wherein the receiving buffer estimator determines whether an amount of streaming data stored in the buffer of the player is within a range, the stream adaptor retrieves a result of estimating whether the amount of the streaming data stored in the buffer is within the range and bandwidth variation information detected by the congestion detector and determines whether the amount of the streaming data stored in the buffer of the player is less than a threshold value, the profile selector adjusts a timestamp scalar according to the result of estimating whether the amount of the streaming data stored in the buffer is within the range and the bandwidth variation information if the amount of the streaming data stored in the buffer is less than the threshold value, thereby adjusting a consumption rate of the streaming data stored in the buffer for re-accumulating the streaming data stored in the buffer, the receiving buffer estimator restores the timestamp scalar to a default value when the streaming data stored in the buffer is accumulated to a predetermined amount, and the profile selector selects one of a plurality of settings in the quality profile according to the result of estimating whether the amount of the streaming data stored in the buffer is within the range and the bandwidth variation information to adjust a bit rate of the streaming data stored in the buffer if the amount of the streaming data stored in the buffer of the player is less than the threshold value.

3. The system as claimed in claim 2, wherein a reset command is sent, when the stream controller receives the control command, to enable the receiving buffer estimator to reset a parameter used for determining the buffer of the player.

4. The system as claimed in claim 2, further comprising a stream encoder, wherein the stream controller sets encoding parameters of the stream encoder, capture parameters of the video and audio capturer, or the input source of the input switcher.

5. The system as claimed in claim 4, further comprising a stream sender, wherein the congestion detector receives feedback information generated by transmitting the streaming data stored in the buffer by the stream sender to determine whether a network is congested.

6. The system as claimed in claim 5, wherein the QoS controller enables the stream adaptor to select one of the plurality of settings in the quality profile according to the network congestion information for adapting bandwidth.

7. The system as claimed in claim 6, wherein the QoS controller estimates a capability to endure bandwidth variation for the player using the receiving buffer estimator.

8. The system as claimed in claim 7, wherein the receiving buffer estimator estimates a length of the streaming data stored in the player to determine whether video and audio quality and the timestamp scalar should be adjusted.

9. The system as claimed in claim 2, wherein the plurality of settings in the quality profile comprise an encoding bit rate, resolution, a frame rate, frame drop option, and the timestamp scalar.

10. The system as claimed in claim 9, further comprising:
an audio re-sampler configured to re-sample audio data captured by the video and audio capturer when the timestamp adjuster has adjusted the timestamp scalar.

11. The system as claimed in claim 10, wherein video data of the streaming contents and the re-sampled audio data are delivered to the stream encoder and are encoded based on the selected one of the plurality of settings in the quality profile.

12. The system as claimed in claim 11, wherein the stream sender transmits encoded streaming with timestamp which is adjusted based on the timestamp scalar to the player and feedback information retrieved by the stream sender is returned to the QoS controller.

13. A non-transitory computer-readable medium encoded with computer executable instructions for performing a method for audio and video control response and bandwidth adaptation based on network streaming applications, applied to a server connected to a player through a network, wherein the computer executable instructions comprise:
   transmitting a control command received by a stream communicator of the server to a stream controller of the server to enable the player to flush the expired streaming data stored in a buffer of the player;
   enabling the stream controller to control an input source of an input switcher;
   estimating whether an amount of streaming data stored in the buffer is within a range by a receiving buffer estimator of a QoS controller of the server;
   detecting bandwidth variation information by a congestion detector of the QoS controller;
   delivering a result of estimating whether the amount of the streaming data stored in the buffer is within the range and the bandwidth variation information to a stream adaptor of the server;
   determining whether the amount of the streaming data stored in the buffer is less than a threshold value; and
   enabling the stream adaptor to adjust a timestamp scalar based on the result of estimating whether the amount of the streaming data stored in the buffer is within the range and the bandwidth variation information if the amount of the streaming data stored in the buffer is less than the threshold value, thereby adjusting a consumption rate of the streaming data stored in the buffer for re-accumulating the streaming data stored in the buffer,
wherein the timestamp scalar is restored to a default value by the stream adaptor when the streaming data stored in the buffer is accumulated to a predetermined amount, and
wherein one of a plurality of settings in a quality profile is selected by the stream adaptor according to the result of estimating whether the amount of the streaming data stored in the buffer is within the range and the bandwidth variation information to adjust a bit rate of the streaming data stored in the buffer if the amount of the streaming data stored in the buffer of the player is less than the threshold value.

\* \* \* \* \*